United States Patent
Forestieri, Sr. et al.

(10) Patent No.: US 9,255,763 B2
(45) Date of Patent: Feb. 9, 2016

(54) LEVELING DEVICES AND METHODS FOR USE IN TUNING AND INSTALLING ACCESSORIES ON ARCHERY BOWS

(71) Applicant: R.S. BOWVISE INC., Hicksville, NY (US)

(72) Inventors: Andrew Forestieri, Sr., Hicksville, NY (US); Andrew J. Forestieri, Jr., Chester, NY (US)

(73) Assignee: R.S. BOWVISE Inc., Hicksville, NY (US)

( * ) Notice: Subject to any disclaimer, the term of this patent is extended or adjusted under 35 U.S.C. 154(b) by 0 days.

(21) Appl. No.: 14/253,863

(22) Filed: Apr. 16, 2014

(65) Prior Publication Data

US 2015/0300768 A1 Oct. 22, 2015

(51) Int. Cl.
*F41B 5/14* (2006.01)
*F41G 1/467* (2006.01)
*G01C 9/26* (2006.01)

(52) U.S. Cl.
CPC . *F41B 5/148* (2013.01); *F41B 5/14* (2013.01); *F41B 5/1449* (2013.01); *F41G 1/467* (2013.01); *G01C 9/26* (2013.01)

(58) Field of Classification Search
CPC ............ F41B 5/14; F41B 5/143; F41B 5/148; F41G 1/467
USPC .......................... 124/86, 87, 88, 44.5; 33/265
See application file for complete search history.

(56) References Cited

U.S. PATENT DOCUMENTS

| | | | | |
|---|---|---|---|---|
| 3,623,468 A | * | 11/1971 | Crest | F41B 5/14 124/24.1 |
| 3,854,217 A | * | 12/1974 | Killian | F41G 1/20 33/265 |
| 4,865,008 A | * | 9/1989 | Troncoso | 124/41.1 |
| 5,285,767 A | * | 2/1994 | Padilla | F41G 1/467 124/80 |
| 5,339,227 A | * | 8/1994 | Jones | F21V 33/008 124/87 |
| 5,465,491 A | * | 11/1995 | Thell | F41G 1/467 33/265 |
| 5,524,351 A | * | 6/1996 | Pinson | F41G 1/467 124/87 |
| 5,630,279 A | * | 5/1997 | Slates | F41G 1/467 124/87 |
| 6,082,012 A | * | 7/2000 | McLeod | F41G 1/467 124/87 |
| 6,539,637 B1 | * | 4/2003 | Hollabaugh | F41G 1/467 124/87 |
| 6,637,122 B2 | * | 10/2003 | Henry | F41B 5/1449 124/86 |

(Continued)

*Primary Examiner* — Alexander Niconovich (57) ABSTRACT

Leveling devices and methods are provided for use in tuning and installing accessories on archery bows such as compound bows. For example, devices and methods are provided for leveling bow risers and arrow rest components of archery bows to enable proper accessory installation and tuning of archery bows.

12 Claims, 6 Drawing Sheets

(56) References Cited

U.S. PATENT DOCUMENTS

| | | | | |
|---|---|---|---|---|
| 6,978,569 | B2 * | 12/2005 | Williamson, IV | F41G 1/44 42/132 |
| 7,100,292 | B2 * | 9/2006 | Afshari | F41G 1/467 124/87 |
| 7,200,944 | B2 * | 4/2007 | Rager | F41G 1/467 124/87 |
| 7,243,432 | B1 * | 7/2007 | Rager | F41G 1/467 124/87 |
| 7,331,112 | B2 * | 2/2008 | Gibbs | F41G 1/467 33/265 |
| 7,487,594 | B2 * | 2/2009 | Labowski | F41G 1/467 124/87 |
| 7,574,811 | B2 * | 8/2009 | Kurtzhals | F41G 1/467 124/87 |
| 7,581,325 | B1 * | 9/2009 | Willman | F41G 1/467 124/87 |
| 7,814,668 | B1 * | 10/2010 | Pulkrabek et al. | 33/263 |
| 7,975,391 | B1 * | 7/2011 | Gillingham | F41G 1/467 124/87 |
| 8,046,927 | B1 * | 11/2011 | Edmundson | F41G 1/467 124/87 |
| 8,069,577 | B1 * | 12/2011 | Willman | F41G 1/467 124/87 |
| 8,166,662 | B2 * | 5/2012 | Williams | F41G 1/467 124/87 |
| 8,171,648 | B2 * | 5/2012 | Summers et al. | 33/265 |
| 8,186,068 | B2 * | 5/2012 | Pulkrabek | F41B 5/14 33/265 |
| 8,677,637 | B2 * | 3/2014 | Willis | F41B 1/467 124/87 |
| 8,689,454 | B2 * | 4/2014 | Pulkrabek | F41G 1/467 124/87 |
| 8,739,419 | B1 * | 6/2014 | Pulkrabek | F41G 1/467 124/87 |
| 8,839,525 | B2 * | 9/2014 | Pulkrabek | F41G 1/467 124/87 |
| 2008/0210211 | A1 * | 9/2008 | Madsen | F41B 5/14 124/88 |
| 2009/0032004 | A1 * | 2/2009 | Jones | F41B 5/14 124/86 |
| 2009/0144994 | A1 * | 6/2009 | Taboada | F41B 5/14 33/265 |
| 2010/0018513 | A1 * | 1/2010 | Scaniffe | F41G 1/44 124/87 |
| 2011/0120440 | A1 * | 5/2011 | Stokes | F41B 5/1426 124/89 |
| 2014/0261354 | A1 * | 9/2014 | Ross, Jr. | F41B 5/143 124/23.1 |
| 2014/0366860 | A1 * | 12/2014 | Naki | F41B 5/148 124/86 |

* cited by examiner

LEVELING DEVICES AND METHODS FOR USE IN TUNING AND INSTALLING ACCESSORIES ON ARCHERY BOWS

TECHNICAL FIELD

The field relates generally to leveling devices and methods for use in tuning and installing accessories on archery bows such as compound bows, and in particular, to devices and methods for leveling bow risers and arrow rest components of archery bows.

BACKGROUND

Bowhunting has become an increasingly popular form of recreational hunting. In the early days of bowhunting, hunters used traditional archery bows such as a longbow or a recurve bow. However, the introduction of the compound bow revolutionized the sport of archery and bowhunting, as the compound bow design has proven to be easy to use and can provide higher arrow velocity and precision arrow flight, as compared to traditional bows. In general, archery bows require frequent adjustment, repair, installment, and tuning of bow strings and peep sights, and other accessories such as arrow rests and sighting devices. When tuning an archery bow or installing accessories on an archery bow, it is important to maintain the archery bow in a level orientation. In particular, to ensure precise alignment and proper installation of accessories such as arrows rests, peep sights and sighting devices on a compound bow, for example, it is imperative to fixedly position the compound bow in level vertical orientation prior to and during such installation.

SUMMARY

Embodiments of the invention generally include leveling devices and methods for use in tuning and installing accessories on archery bows such as compound bows. For example, in one embodiment of the invention, a device is provided for leveling a bow riser of an archery bow. The device includes a housing having a first through hole and a second through hole aligned along a first direction. The first and second through holes are configured to insertably receive mounting bolts for mounting the housing to a bow riser using mounting holes formed on the bow riser. The device further includes as first level element disposed within a first cavity of the housing, and a second level element disposed within a second cavity of the housing. The first level element provides a level indicator along a second direction that is orthogonal to the first direction, and the second level element provides a level indicator along a third direction that is orthogonal to both the first and second directions.

In another embodiment of the invention, a device is provided for leveling an arrow rest that is installed on a bow riser of an archery bow. The device includes a housing having a first contact surface and an opposing second contact surface. The first contact surface is smaller in length than a length of the second contact surface, and the first and second contact surfaces are orthogonal to a first axis of the device. The device further includes a cavity formed in the housing, and a level element disposed within the cavity. The level element provides as level indicator along a direction of a second axis, which is orthogonal to a direction of the first axis. The device is configured to be placed on top of mounting hardware of an arrow rest, which is being installed on a bow riser of an archery bow, to adjustably position the mounting hardware level in a horizontal direction along the second axis of the device, and thereby align the first axis of the device in a direction along a longitudinal vertical axis of the bow riser.

In yet another embodiment of the invention, a method is provided for tuning an archery bow. The method includes mounting a leveling device to a bow riser of the archery bow using mounting holes formed on the bow riser, wherein the leveling device comprises a first level element to provide a level indicator along a first direction that is orthogonal to a central longitudinal axis of the bow riser, and wherein the leveling device comprises a second level element to provide a level indicator along a second direction that is orthogonal to both the first direction and the central longitudinal axis of the bow riser. The vertical orientation of the bow riser is adjusted until the first and second level elements concurrently provide a level indication along the first and second directions, thereby resulting in the central longitudinal axis of the bow riser being positioned in a vertical level orientation, and a tuning operation is performed to tune the archery how with the bow riser positioned in the vertical level origination. The leveling device can he mounted to the bow riser using standard mounting holes that are formed on the bow riser for installing a sighting device.

In another embodiment of the invention, a bow riser of an archery bow is provided, wherein the bow riser includes a first cavity and a second cavity, which are formed within a body of the bow riser. The bow riser further includes a first level element disposed within the first cavity, and a second level element disposed within the second cavity. The first level element provides a level indicator along a first direction that is orthogonal to a central longitudinal axis of the bow riser, and wherein the second level element provides a level indicator along a second direction that is orthogonal to both the first direction and the central longitudinal axis of the bow riser.

These and other embodiments of the invention will be described in the following detailed description of embodiments which is to be read in conjunction with the accompanying figures.

DETAILED DESCRIPTION OF EMBODIMENTS

Embodiments of the invention will now be described in further detail with reference to leveling devices and methods for use in tuning and installing accessories on archery bows such as compound bows. With initial reference to FIG. 1, an example compound bow 100 is shown, which can be tuned and accessorized using leveling devices according to embodiments of the invention. In general, the compound bow 100 comprises a bow riser 102, an upper limb 104 and lower limb 106 attached to opposite ends of the bow riser 102, upper and lower cam elements 108 and 110, cables 112, and a bow string 114. The bow string 114 includes a nocking loop 116 and a peep sight 118. Various accessories are attached to the bow riser 102 including, for example, a sighting device 120, a cable guard 122, an arrow rest element 124, and a stabilizer device 126. The bow riser 102 comprises a grip region 128, which is held by an individual when using the compound bow 100. The functions of the various components of the compound bow 100 shown in FIG. 1 are well known in the art and, therefore, no detailed discussion is necessary for understanding the invention.

Figure 1:
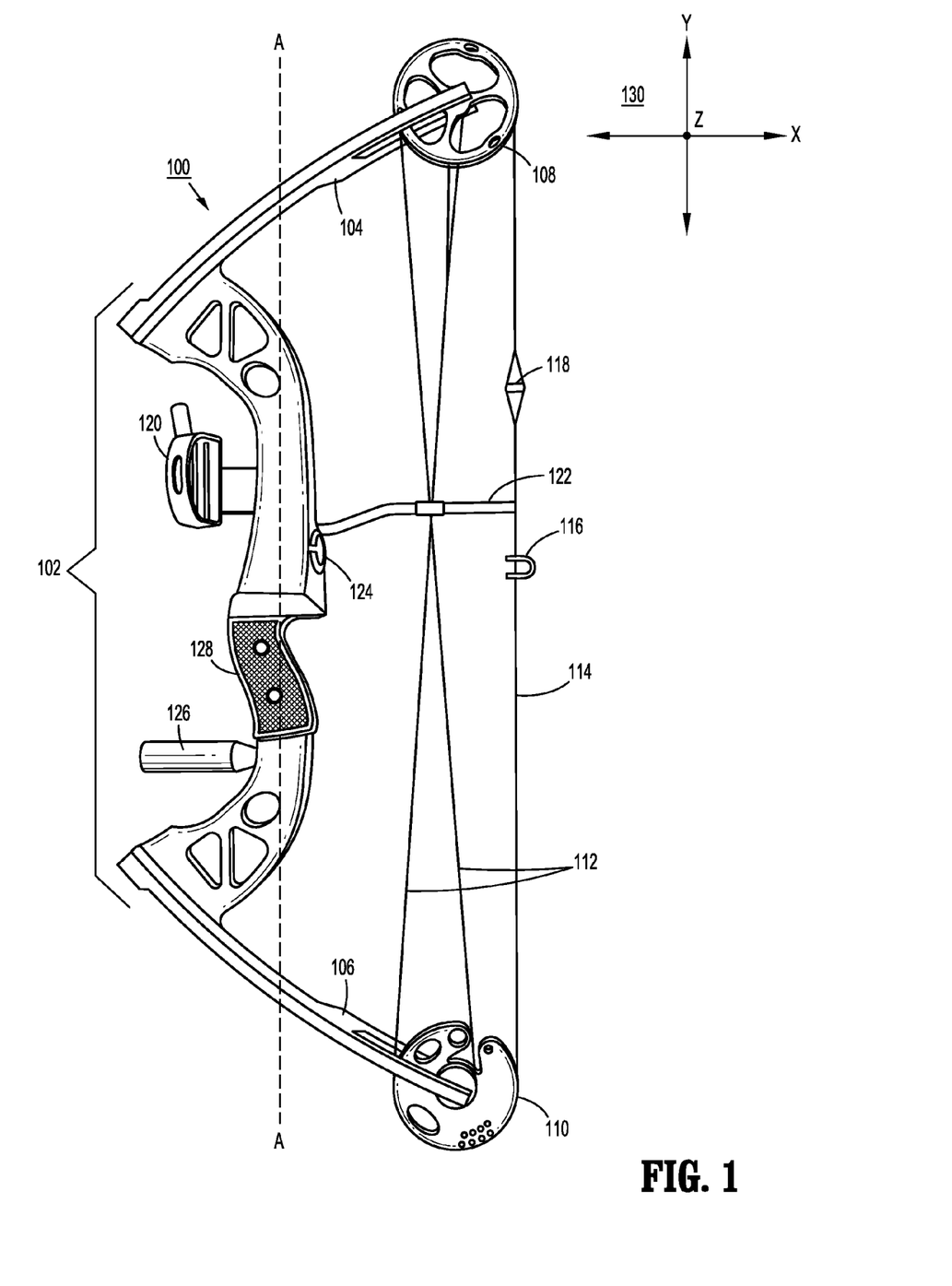
FIG. 1 illustrates an example of compound bow that can be tuned and accessorized using leveling devices according to embodiments of the invention.

FIG. 1 further depicts a dashed line A-A which denotes a central longitudinal axis of the bow riser 102, as well as a three-axis coordinate system 130 including an X-axis, a Y-axis, and a Z-axis, which are all orthogonal in relation to each other. In FIG. 1, the X-axis and Y-axis are shown to extend orthogonal to each other in a 2D plane of the drawing, and the Z-axis is shown to extend in a direction in and out of the drawing. Moreover, FIG. 1 shows that the central longitudinal axis A-A of the bow riser 102 extends in the same direction as the Y-axis.

In accordance with principles of the invention, when tuning the compound bow 100 or when installing accessories on the bow riser 102, it is imperative to maintain the bow riser 102 level in a vertical direction. By way of specific example, with regard to the coordinate system 130 shown in FIG. 1, the central longitudinal axis A-A of the bow riser 102 should be maintained level in the Y-axis direction. One method to position the central longitudinal axis A-A of the bow riser 102 in a level vertical orientation is to concurrently position both the X-axis and the Z-axis in a level horizontal orientation. Indeed, by principles of geometry, when the X-axis and the Z-axis are both leveled in a horizontal orientation, it necessarily follows that the Y-axis is level in a vertical orientation. These geometric concepts are implemented in accordance with embodiments of the invention for leveling a bow riser using a leveling device as depicted in FIG. 2.

Figure 2:
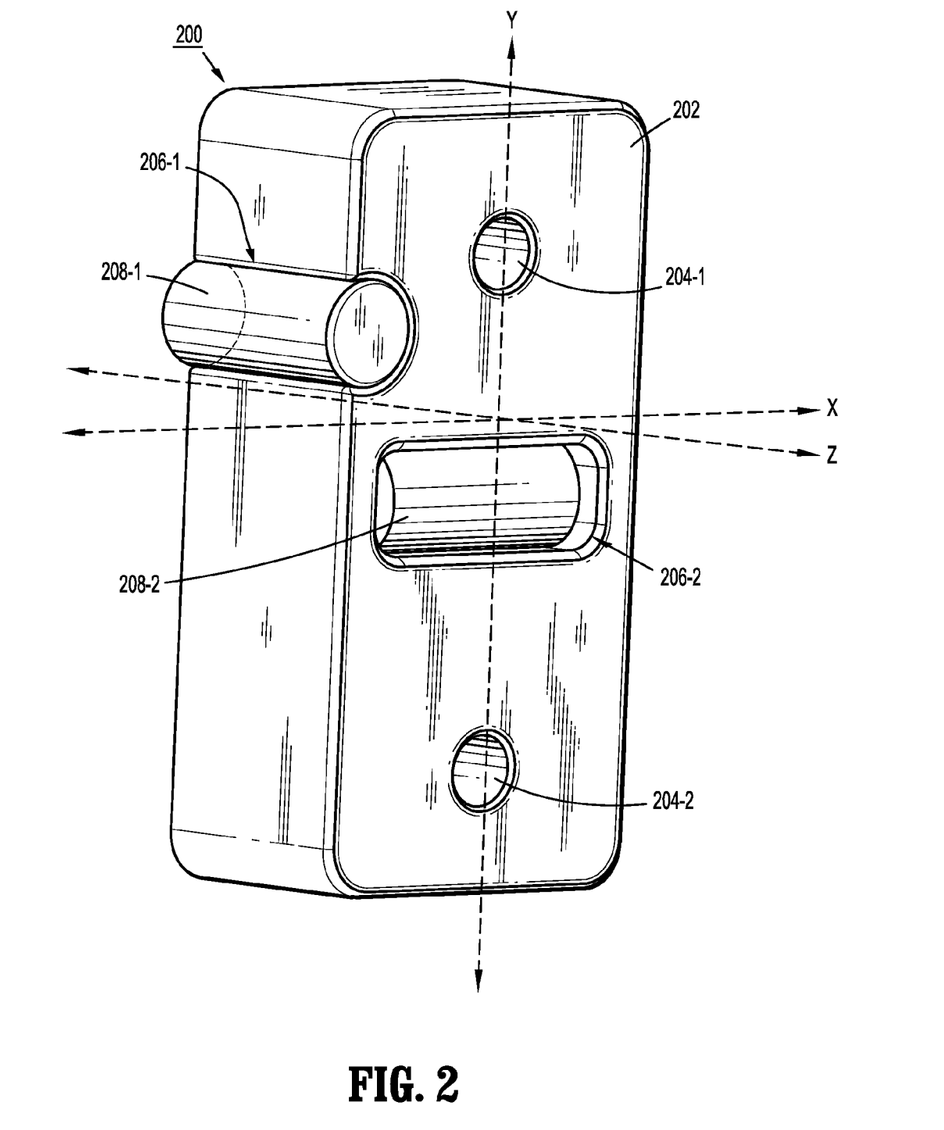
FIG. 2 is a perspective schematic view of a bow riser leveling device according to an embodiment of the invention.

In particular, FIG. 2 is a perspective schematic view of a bow riser leveling device 200 according to an embodiment of the invention. The bow riser leveling device 200 comprises a device housing 202 having a first through hole 204-1 and a second through hole 204-2, which extend through the device housing 202. Furthermore, the device housing 202 comprises a first retaining cavity 206-1 and a second retaining cavity 206-2 formed therein. The first retaining cavity 206-1 is configured to retain a first level element 208-1, and the second retaining cavity 206-2 is configured to retain a second level element 208-2. In one embodiment of the invention, the first and second level elements 208-1 and 208-2 are implemented using a tubular spirit level (or bubble level), as is known in the art. Moreover, in one embodiment of the invention, the second retaining cavity 206-2 is formed completely through the device housing 202 so that the second level element 208-2 can be viewed on either side of the device housing 202.

In the embodiment of FIG. 2, the first and second through holes 204-1 and 204-2 are configured to insertably receive threaded bolts that are used to attach the bow riser leveling device 200 to a bow riser. In one embodiment of the invention, the first and second through holes 204-1 and 204-2 are configured to be aligned with industry standard mourning holes that are drilled into a bow riser for mounting an accessory to the bow riser. For example, in one preferred embodiment of the invention, the first and second through holes 204-1 and 204-2 are configured to be aligned with industry standard mounting holes that are drilled into a bow riser for mounting a commercially available sighting device.

Preferably, the mounting holes on the bow riser, which are used to attach the bow riser leveling device 202, are mounting holes that are located along a central longitudinal axis of the bow riser, or otherwise oriented in an orthogonal orientation with respect to the central longitudinal axis of the bow riser. In particular, as shown in FIG. 2, the first and second through holes 204-1 and 204-2 are shown to be vertically aligned along a Y-axis direction as indicated by the dashed arrow Y. Moreover, the first retaining cavity 206-1 and corresponding first level element 208-1 are shown to be horizontally disposed along a first direction (Z-axis direction as indicated by the dashed arrow Z) that is orthogonal to the Y-axis. Further, the second retaining cavity 206-2 and corresponding second level element 208-2 are shown to be horizontally disposed along a second direction (X-axis direction as indicated by the dashed arrow X) that is orthogonal to the Y-axis and Z-axis directions. With this structural configuration as depicted in FIG. 2, the bow riser leveling device 200 can be positioned in a level vertical orientation (in the Y-axis direction) when both the first and second level elements 208-1 and 208-2 indicate level horizontal orientations (in the respective Z-axis and X-axis directions).

Figure 3:
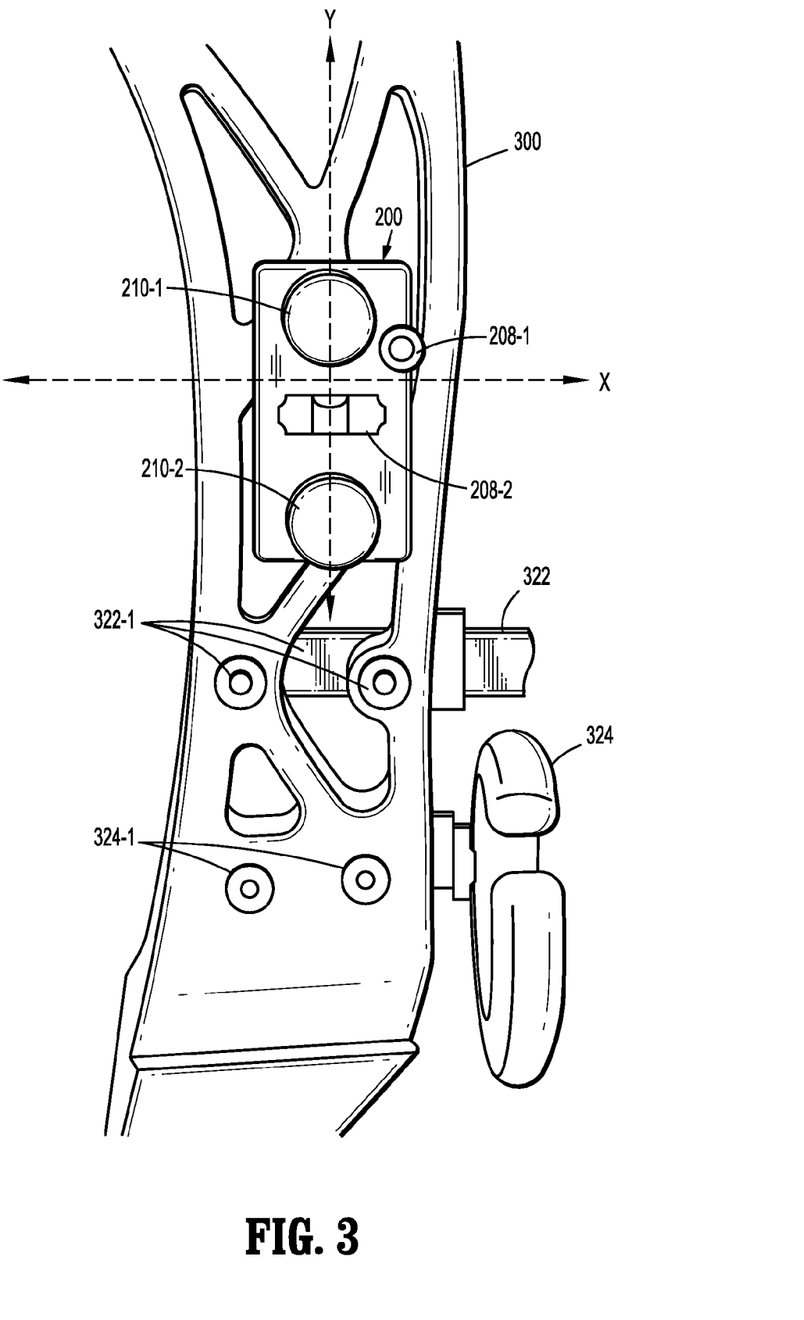
FIG. 3 schematically illustrates a method for leveling a bow riser using the leveling device of FIG. 2, according to an embodiment of the invention.

FIG. 3 schematically illustrates a method for leveling a bow riser using the leveling device of FIG. 2, according to an embodiment of the invention. In particular, FIG. 3 illustrates a portion of a bow riser 300 having a cable guard 322 mounted thereon using respective mounting hardware 322-1, and having an arrow rest device 324 mounted thereon using respective mounting hardware 324-1. FIG. 3 further depicts the bow riser leveling device 200 mounted to the bow riser 300 using first and second threaded bolts 210-1 and 210-2.

More specifically, in the example embodiment shown in FIG. 3, the bow riser leveling device 200 is shown to be attached to the bow riser 300 using standard mounting holes that are drilled into the bow riser 300 for attaching a sighting device. The bow riser leveling device 200 is disposed on a "shelf side" of the bow riser 300 opposite the side on which the sighting device would be mounted. As in known in the art, bow risers are typically fabricated with mounting holes that are formed within the body of the bow riser, and metallic threaded inserts are glued or epoxied into the drilled holes to enable attachment of accessories to the bow riser using threaded bolts.

As further shown in FIG. 3, the sighting device mounting holes in the bow riser 300, which are temporarily used to attach the bow riser leveling device 200, are aligned along a central longitudinal axis (Y-axis as shown by the dashed line Y of the bow riser 300. With the bow riser leveling device 200 mounted to the bow riser 300 in the configuration/orientation depicted in FIG. 3, the central longitudinal axis (Y-axis) of the bow riser 300 can be placed into a level vertical orientation (in the Y-axis direction) by using the first and second leveling elements 208-1 and 208-2 to position the bow riser leveling device 200 in a horizontal level orientation along the X-axis (dashed line X shown in FIG. 3) and the Z-axis (i.e., the axis extending orthogonal to the plane of the drawing sheet). Once the bow riser 300 is positioned in a level vertical orientation, an individual can proceed to tune the bow or otherwise install other accessories.

In one embodiment of the invention, when leveling a bow riser using the bow riser leveling device 200 as depicted in FIG. 3, the compound bow can be adjustably positioned into a vertical level orientation (and fixedly held place in a vertical level orientation while being tuned/accessorized) using a bow leveling tuning system such as disclosed in U.S. Pat. No.

5,344,110, entitled Holder Apparatus For Positioning Archery Bow Relative To Orthogonal Axes, which is commonly owned and incorporated herein by reference. Commercially available products, which are based on the structural embodiments disclosed in U.S. Pat. No. 5,344,110, are currently manufactured and sold by the current assignee, R.S. Bowvise Inc. These commercially available products are currently sold under the trade name R.S. BOWVISE™. These commercially available bow leveling tuning products are configured to securely hold an archery bow in an upright position, while providing flexibility in tipping the archery bow forward or side to side and locking in at any angle. These tuning devices enable hands free mounting of accessories to archery bows, and well as micro adjustment capabilities for nock alignment and sight installation.

Figure 4:
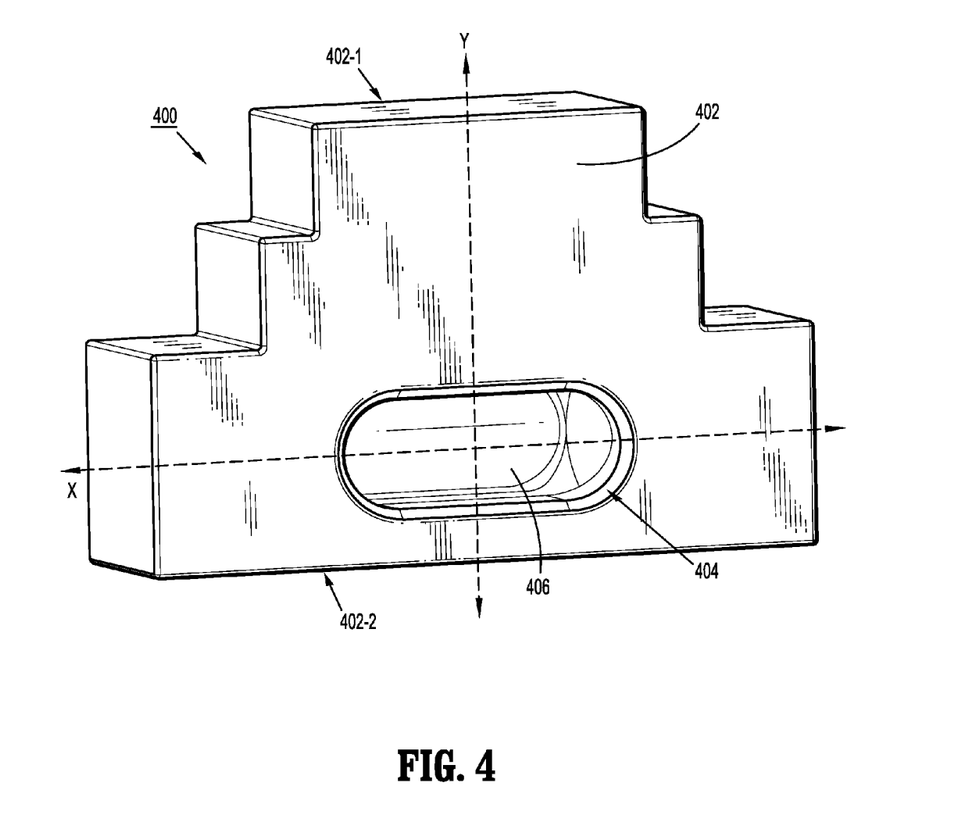
FIG. 4 is a perspective schematic view of an arrow rest leveling device according to an embodiment of the invention.

FIG. 4 is a perspective schematic view of an arrow rest leveling device 400 according to an embodiment of the invention. The arrow rest leveling device 400 comprises a device housing 402 having a first surface 402-1 and a second surface 402-2, which are different in length. The device housing 402 further comprises a retaining cavity 404 that is configured to retain a level element 406. In one embodiment of the invention, the level element 406 is implemented using a tubular spirit level (or bubble level), as is known in the art. Moreover, in one embodiment of the invention, the retaining cavity 404 is formed completely through the device housing 402 so that the level element 406 can be viewed on either side of the device housing 402. As further depicted in FIG. 4, the retaining cavity 404 and corresponding level element 406 are shown to be disposed along a horizontal direction (x-axis direction) as indicated by the dashed arrow X, which is orthogonal to a Y-axis direction as indicated by the dashed arrow Y. The arrow rest leveling device 400 is configured for use as a level device when installing an arrow rest device to a bow riser using a method as depicted in FIG. 5, for example.

Figure 5:
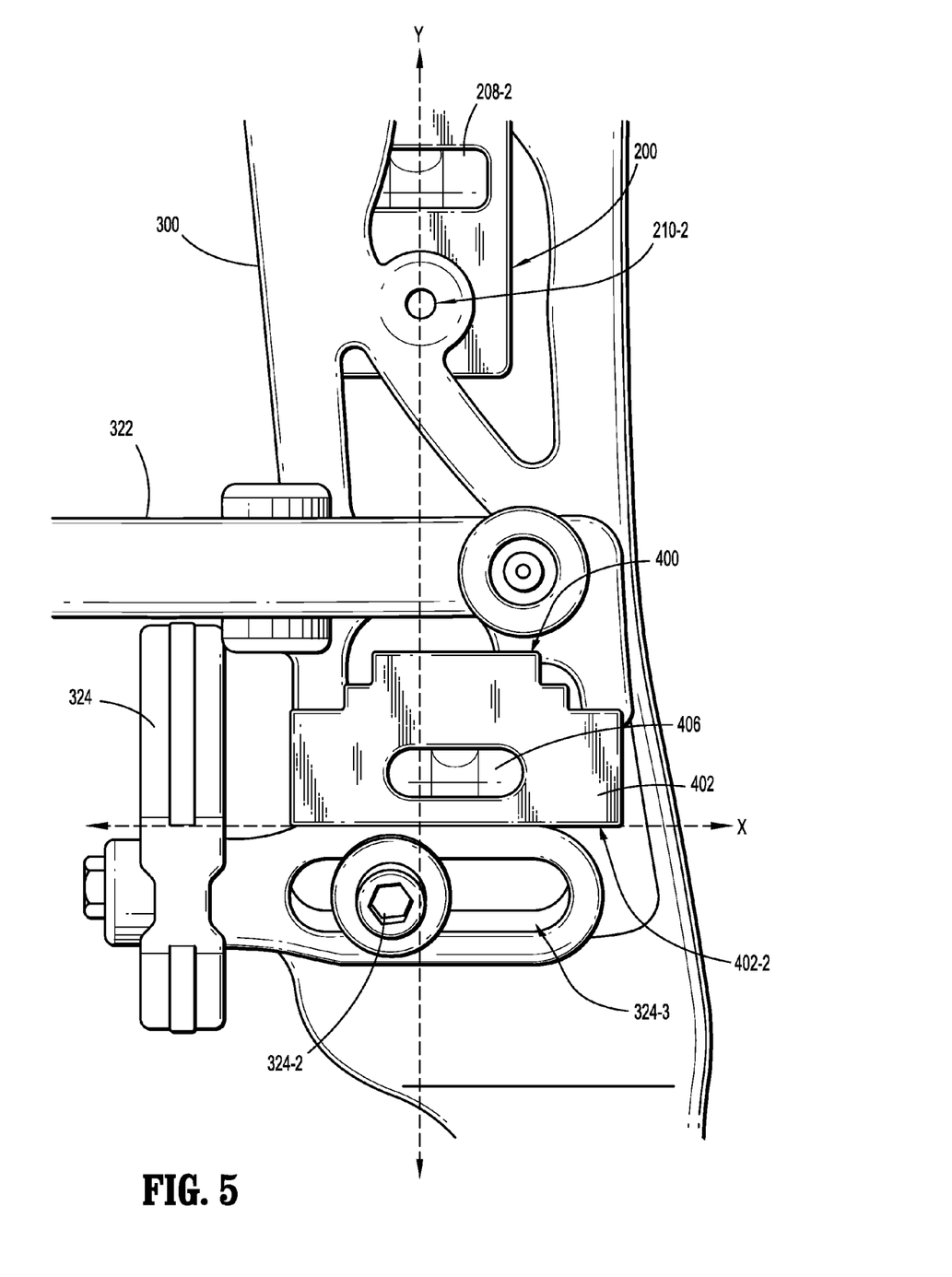
FIG. 5 schematically illustrates a method of leveling an arrow rest device using the leveling devices of FIGS. 2 and 4, according to an embodiment of the invention.

FIG. 5 schematically illustrates a method of leveling an arrow rest device 324 using the leveling devices of FIGS. 2 and 4, according to an embodiment of the invention. In particular, FIG. 5 illustrates an opposite side of the portion of the bow riser 300 shown in FIG. 3, wherein the bow riser 300 comprises the cable guard 322 mounted thereon, and the arrow rest device 324 mounted thereon using respective mounting hardware 324-2/324-3. In FIG. 5, the bow riser leveling device 200 is shown mounted to the bow riser 300 using the standard mounting holes (e.g., mounting hole 210-2) for attaching a sighting device. In FIG. 5, it is assumed that the bow riser 300 is already positioned in a vertical level orientation along the central longitudinal axis, i.e., Y-axis, using the techniques as discussed above with reference to FIG. 3.

With the bow riser 300 in a proper level vertical orientation, the arrow rest leveling device 400 can be used to fixedly secure the arrow rest device 324 to the bow riser 300 in a level horizontal orientation (X-axis direction), which is orthogonal to the already leveled central longitudinal axis (Y-axis direction) of the bow riser 300. In particular, as shown in FIG. 5, the mounting hardware 324-2/324-3 of the arrow rest device 324 comprises a retaining element 324-2 (e.g., bolt) and a horizontal adjustment element 324-3. When the retaining element 324-2 is loose, the horizontal adjustment element 324-3 can adjustably slide back on forth along the X-axis direction to place the arrow rest element 324 in a desired positional distance from the bow riser 300. When in proper position, the retaining element 324-2 is tightened to secure the horizontal adjustment element 324-3 in place. During this adjustment process, as depicted in FIG. 5, the arrow rest leveling device 400 is placed on top of the horizontal adjustment element 324-3 and used as a leveling device so that a longitudinal axis of the horizontal adjustment element 324-3 is maintained in a horizontal level orientation (with regard to the X-axis) as the retaining element 324-2 is tightened to secure the arrow rest 324 in fixed position.

As depicted in FIG. 4, the arrow rest leveling device 400 has at least two different size contact surfaces 402-1 and 402-2, which are used to rest the leveling device 400 on a similar size surface of standard arrow rest mounting hardware. As shown in FIG. 5, the arrow rest leveling device 400 is positioned with the longer contact surface 402-2 on top of, and in contact with, the horizontal adjustment element 324-2 of the mounting hardware. The length of the arrow rest leveling device 400 along the contact surface 402-2 is similar to the length of the horizontal adjustment element 324-2 of the arrow rest mounting hardware shown in FIG. 5. With other standard arrow rest mounting hardware with smaller profiles, the arrow rest leveling device 400 can be positioned with the shorter contact surface 402-1 on top of, and in contact with, shorter length mounting hardware components.

In another embodiment of the invention, the contact surfaces 402-1 and 402- of the arrow rest leveling device 400 can have a thin gum-rubber layer formed or otherwise disposed thereon to allow the arrow rest leveling device 400 to removably stick to a surface of the arrow rest mounting hardware. This enables the arrow rest leveling device 400 to be maintained in position on the mounting hardware, hands-free, as an individual adjustably maneuvers the arrow rest hardware in a level position using the arrow rest leveling device 400. For example, a thin layer of two-sided tape can be applied to the contact surfaces 402-1 and 402-2 when using the arrow rest level device 400 to enable hands free leveling of the arrow rest, while the individual is adjustably mounting the arrow rest device 324 on the bow riser 300.

The bow riser and arrow rest leveling devices 200 and 400 as discussed above may be made of any suitable materials such as metallic materials, plastics or composite materials, using suitable manufacturing techniques such as injection molding, for example, or by CNC machining techniques. In one preferred embodiment, the leveling devices 200 and 400 are CNC machined from a block of aluminum or other suitable metallic material. The dimensions of the leveling devices 200 and 400 can vary depending on the application. For example, in one non-limiting embodiment, the bow riser leveling device 200 shown in FIG. 2 can have a length of about 2 inches (Y-axis direction), a width of about 1 inch (X-axis direction) and a thickness of about ⅝ of an inch (Z-axis direction). In any event, bow riser and arrow rest leveling devices according to embodiments of the invention can be fabricated with various dimensions to accommodate a wide range of variable sizes and shapes that are suitable for a given application.

Figure 6:
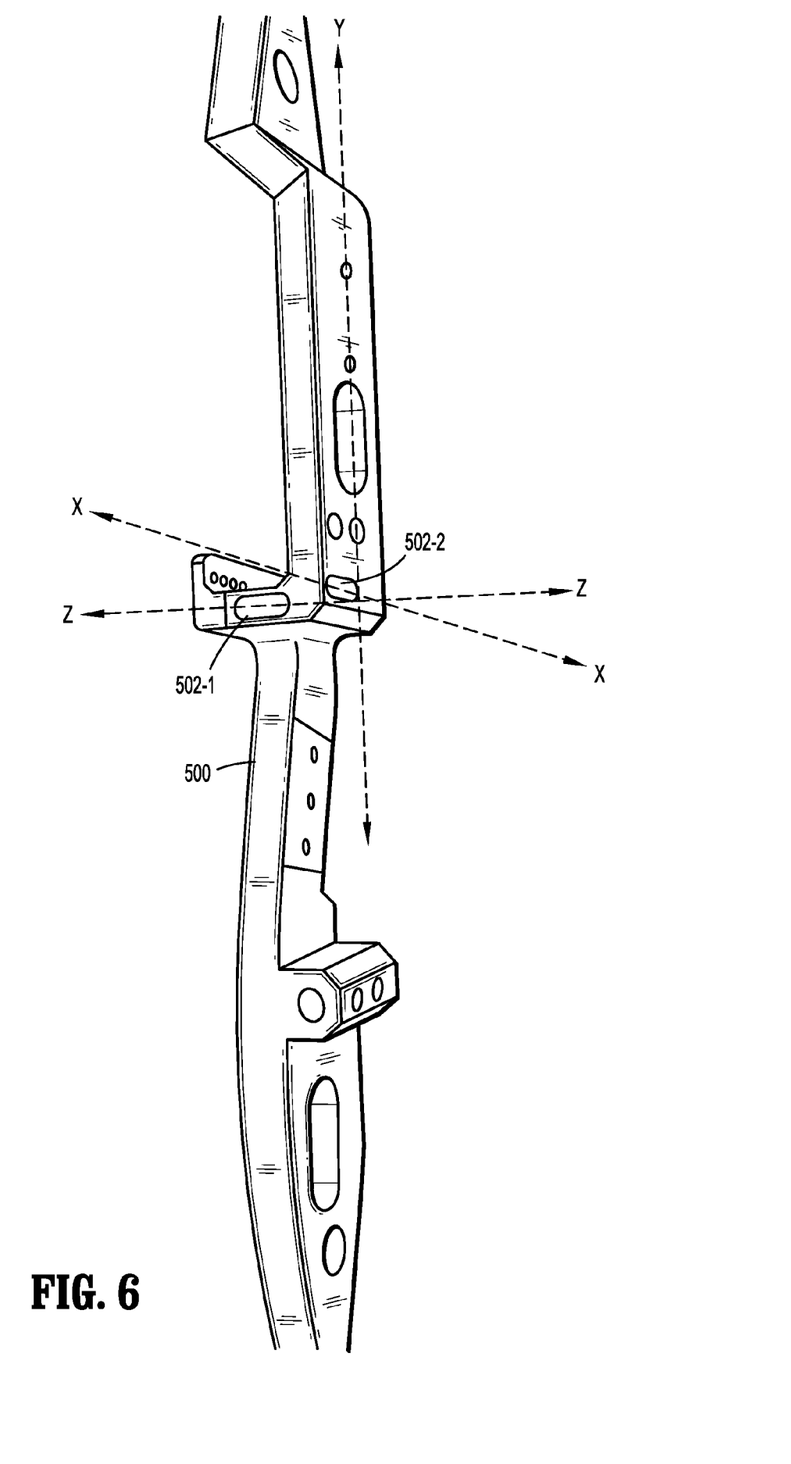
FIG. 6 is a perspective view of a bow riser having integrated leveling devices, according to an embodiment of the invention.

In other embodiments of the invention, rather than using separate leveling devices, bow risers and/or arrow rest devices can be fabricated with integrated level devices (e.g., integrated bubble levels). For example, FIG. 6 is a perspective view of a bow riser 500 having integrated leveling devices, according to an embodiment of the invention. More specifically, as shown in FIG. 6, the bow riser 500 includes first and second cavities 502-1 and 502-2 that are formed within the body of the bow riser 500. The first and second cavities 502-1 and 502-2 are configured to retain first and second bubble level devices in an orientation similar to that as described above with reference to FIG. 2.

In particular, as shown in FIG. 6, the first retaining cavity 502-1 and corresponding first level element are shown to be horizontally disposed along a first direction (Z-axis direction as indicated by the dashed arrow Z) that is orthogonal to a central longitudinal axis (Y-axis) of the bow riser 500. Further, the second retaining cavity 502-2 and corresponding second level element are shown to be horizontally disposed along a second direction (X-axis direction as indicated by the dashed arrow X) that is orthogonal to the Y-axis and Z-axis directions. With this structural configuration, as depicted in FIG. 6, the bow riser leveling device 500 can be positioned in a level vertical orientation (in the Y-axis direction) when both the first and second level elements disposed in the retaining cavities 502-1 and 502-2 indicate level horizontal orientations tin the respective Z-axis and X-axis directions).

Moreover, an integrated level device within the bow riser 500 can he used not only for tuning, but also as a level indicator when operating the bow. For example, a bubble level element within the first retaining cavity 502-1 can he used as a level indicator in conjunction with, or alternative to, another level indicator that is included as part of a sighting device, for example, and which is positioned in the same horizontal orientation (Z-axis) as the bubble level within the first cavity 502-1. Such level indicators can be utilized to ensure the bow riser 500 is maintained horizontally level at least with regard to the Z-axis orientation of the bow riser when aiming an arrow at a target using the sighting device.

Although exemplary embodiments of the present invention have been described herein with reference to the accompanying figures, it is to be understood that the invention is not limited to those precise embodiments, and that various other changes and modifications may be made therein by one skilled in the art without departing from the scope of the appended claims.

What is claimed is:

1. A device for leveling a bow riser of an archery bow, the device comprising:
    a housing comprising a first through hole and a second through hole aligned along a first direction, wherein the first and second through holes are configured to insertably receive mounting bolts for mounting the housing to a bow riser using corresponding mounting holes formed along the first direction on the bow riser, wherein the first direction is aligned with a central longitudinal axis of the bow riser;
    a first level element disposed within a first cavity of the housing; and
    a second level element disposed within a second cavity of the housing,
        wherein the first level element provides a level indicator along a second direction that is orthogonal to the first direction; and
        wherein the second level element provides a level indicator along a third direction that is orthogonal to both the first and second directions, wherein the third direction is aligned with a shooting direction of the archery bow.

2. The device of claim 1, wherein the first and second level elements are bubble level elements.

3. The device of claim 1, wherein the corresponding mounting holes formed along the first direction on the bow riser are standard mounting holes for mounting a sighting device.

4. The device of claim 1, wherein second cavity is formed through the housing such that the second level element is visible on opposing sides of the device.

5. The device of claim 1, wherein the device is machined from a block of metallic material.

6. A device for leveling an arrow rest element installed on a bow riser of an archery bow, the device comprising:
    a housing having a first contact surface and an opposing second contact surface, wherein the first contact surface is smaller in length than a length of the second contact surface, and wherein the first and second contact surfaces are orthogonal to a first axis of the device;
    a cavity formed in the housing;
    a level element disposed within the cavity, wherein the level element provides a level indicator along a direction of a second axis of the device that is orthogonal to a direction of the first axis,
        wherein the device is configured to be placed on top of mounting hardware of an arrow rest being installed on a bow riser of an archery bow with at least one of the first contact surface and the second contact surface in contact with the top of the mounting hardware, to adjustably position the mounting hardware level in a horizontal direction along the second axis of the device in alignment with a shooting direction, and thereby align the first axis of the device with a central longitudinal vertical axis of the bow riser and align the arrow rest element with the second axis of the device.

7. The device of claim 6, wherein the level element is a bubble level element.

8. The device of claim 6, wherein cavity is formed through the housing such that the level element is visible on opposing sides of the device.

9. The device of claim 6, further comprising a gum rubber layer disposed on the first and second contact surfaces of the housing to removably stick the device to hardware of the arrow rest element when adjustably leveling the arrow rest element.

10. The device of claim 6, further comprising two-sided tape disposed on the first and second contact surfaces of the housing to removably stick the device to hardware of the arrow rest element when adjustably leveling the arrow rest element.

11. The device of claim 6, wherein the device is machined from a block of metallic material.

12. A bow riser of an archery bow, the bow riser comprising a first cavity and a second cavity, wherein the first and second cavities are formed within a body of the bow riser, and wherein the bow riser comprises a first level element disposed within the first cavity, and a second level element disposed within the second cavity,
    wherein the first level element provides a level indicator along a first direction that is orthogonal to a central longitudinal axis of the bow riser, and wherein the second level element provides a level indicator along a second direction that is orthogonal to both the first direction and the central longitudinal axis of the bow riser, and wherein the second direction is aligned with a shooting direction of the archery bow.

* * * * *